(12) United States Patent
Bandi et al.

(10) Patent No.: US 10,623,354 B2
(45) Date of Patent: Apr. 14, 2020

(54) PREVIEW OF COMPRESSED FILE EMAIL ATTACHMENTS

(71) Applicant: Oath Inc., New York, NY (US)

(72) Inventors: Aditya Bandi, Sunnyvale, CA (US); Mayukh Bhaowal, Redwood City, CA (US); Niketh Sabbineni, Sunnyvale, CA (US); Ashwik Battu, Bangalore (IN); Prachi Pundeer, San Francisco, CA (US); Ajay Narang, Bangalore (IN); Kevin Patel, Sunnyvale, CA (US)

(73) Assignee: Oath Inc., New York, NY (US)

( * ) Notice: Subject to any disclaimer, the term of this patent is extended or adjusted under 35 U.S.C. 154(b) by 228 days.

(21) Appl. No.: 14/945,415

(22) Filed: Nov. 18, 2015

(65) Prior Publication Data
US 2017/0142042 A1 May 18, 2017

(51) Int. Cl.
*H04L 12/58* (2006.01)
*G06F 16/16* (2019.01)
*G06F 16/957* (2019.01)

(52) U.S. Cl.
CPC ............ *H04L 51/08* (2013.01); *G06F 16/168* (2019.01); *G06F 16/9577* (2019.01)

(58) Field of Classification Search
CPC .......................... H04L 51/08; G06F 17/30153
See application file for complete search history.

(56) References Cited

U.S. PATENT DOCUMENTS

| | | | | |
|---|---|---|---|---|
| 2006/0075046 A1* | 4/2006 | Yozell-Epstein | .... | G06Q 10/107 709/206 |
| 2007/0067362 A1* | 3/2007 | McArdle | ........... | G06F 17/30073 |
| 2007/0250578 A1* | 10/2007 | Hardy | ................ | G06Q 10/107 709/206 |
| 2011/0314384 A1* | 12/2011 | Lindgren | ............ | G06Q 10/107 715/739 |
| 2012/0221943 A1* | 8/2012 | Yamada | .................. | G06F 9/451 715/243 |
| 2012/0226760 A1* | 9/2012 | Lewis | .................... | H04L 51/08 709/206 |
| 2015/0095840 A1* | 4/2015 | Soshin | ................. | G06F 3/0481 715/781 |

(Continued)

OTHER PUBLICATIONS

Rojas, Mauricio. "File Previewers for Outlook." ArtinSoft the World's Leading Software Migration, Jan. 26, 2010, blogs.artinsoft.net/Mrojas/archive/2010/01/26/File-Previewers-for-Outlook.aspx.*

(Continued)

*Primary Examiner* — Austin J Moreau
(74) *Attorney, Agent, or Firm* — Cooper Legal Group, LLC

(57) ABSTRACT

A system and method of generating a preview of a file attachment includes receiving the file attachment in an email server. The file attachment can be received either during composition of the email or when receiving an inbound email. Determining if the file attachment is a previewable file type or compressed file type or non-previewable file type and automatically generating a preview of the file attachment including identifying the file attachment, parsing the file attachment to identify content of the file attachment, wherein the identified content includes a pagination of the file attachment. A file structure for each page of the file attachment is created and then saved to an attachment store in the email server.

20 Claims, 12 Drawing Sheets

(56) References Cited

U.S. PATENT DOCUMENTS

| | | | | |
|---|---|---|---|---|
| 2015/0163326 A1* | 6/2015 | Pan | ............... | H04L 69/04 |
| | | | | 709/217 |
| 2015/0200885 A1* | 7/2015 | Sharp | ............... | H04L 51/08 |
| | | | | 709/206 |
| 2015/0350133 A1* | 12/2015 | Murphy | ............... | H04L 67/42 |
| | | | | 709/203 |
| 2016/0294749 A1* | 10/2016 | Balasubramanian | ... | H04L 51/08 |

OTHER PUBLICATIONS

PowerArchiver 2012 for Business. Apr. 29, 2013, web.archive.org/web/20130429201814/http://www.powerarchiver.com/powerarchiver-2012-for-business/.*

* cited by examiner

FIG. 2

Yahoo! Mail — 200

Home Mail News Sports Finance Weather Games Groups Answers Screen Flickr Mobile More ˅

Jennifer

Compose — 201 — Search Mail

Delete  Move˅  Spam˅  ••• More˅ — 210

Last night meetup — 208

Files from Chris

- Environment.zip
- DSC1100.jpg — 230
- DSC1107.jpg — 232
- Feedbackform.pdf — 234
- Insurance — 236
- Last weekend — 238

228

204

Christina Angeli — 202
To: Me
Today at 1:10 PM

Hey Jenny!
It was great to see you at the meetup last night. We discussed a lot more things after you left. I'm sending you all the documents Daniel shared with us. We can reference them and build over them. I've also added a couple of photos from the meetup. If you have any thoughts you can always come over to the studio for lunch or coffee and we can have a longer chat.
Do take a look at the Ecological Sustainability on Page 13 in Conversation Concept.pdf.
I think its very relevant to what you talked about yesterday.
Looking forward to hear from you soon.

212

228A 8 files  *  View All  *  Download all ˅

206

Reply   Reply All   Forward — 214

Inbox (8)
Drafts
Sent
Spam — 203
Trash
˅ Folders
  Events
  Newsletters
  Receipts
  Soccer Team
  Taxes
  Trips
  Work
  Xylophone
˃ Recent Sponsored

*Savings*
360 Savings Account
No Fees. No minimums. FDIC Insured.
Open online in less than 5 minutes.
205

PREVIEW OF COMPRESSED FILE EMAIL ATTACHMENTS

BACKGROUND

Emails are often sent with compressed and uncompressed files attached. The compressed file attachment can include multiple individual files and a file structure that organizes the individual files. When a user receives an email with a compressed file attached, the email application cannot provide a preview to each of the individual files included in the compressed file attachment. Further, the email application cannot provide access each one of the individual files in the compressed file attachment. When a user receives an email with an uncompressed file attached, the email application typically does not generate a preview of the uncompressed file until the user opens the email.

A typical email application requires the compressed file attachment to be downloaded before the contents of the compressed file attachment can be accessed or any of the individual files inside the compressed file attachment can be accessed or even previewed. The downloaded compressed file must then be decompressed and saved in the decompressed format before each of the individual files and file structure of the individual decompressed files can be accessed. Each of the individual decompressed files must be individually selected and accessed to be reviewed. The file structure provides the organization of the individual decompressed files included in the compressed file attachment. The file structure can only be accessed or even previewed after the compressed file attachment has been decompressed and the individual decompressed files and file structure have been saved.

The typical email application user experience is cumbersome and prevents seamless use and sharing of compressed file attachments.

SUMMARY

Broadly speaking, the present invention fills these needs by providing a system and method for automatically generating previews of a compressed file attached to a received email. The compressed file can include multiple, individual files and a file structure organizing the individual files. The preview provides access to each of the individual files and can also allow access to view and navigate the file structure, all without requiring the user to download the compressed file attachment. It should be appreciated that the present invention can be implemented in numerous ways, including as a process, an apparatus, a system, computer readable media, or a device. Several inventive embodiments of the present invention are described below.

One embodiment provides a method of generating a preview of a file attachment includes receiving the file attachment in an email server. The file attachment can be received either during composition of the email or when receiving an inbound email. Determining if the file attachment is a previewable file type or compressed file type or non-previewable file type and automatically generating a preview of the file attachment including identifying the file attachment, parsing the file attachment to identify content of the file attachment, wherein the identified content includes a pagination of the file attachment. A file structure for each page of the file attachment is created and then saved to an attachment store coupled to the email server.

Another embodiment provides a system for receiving an email with a compressed file attachment, identifying the type of the compressed file attachment, identifying a file decompression module corresponding to the type of compressed file attachment, activating the decompression module to decompress the compressed file attachment to produce a decompressed file and to output the decompressed file for preview and storage.

Decompressing the compressed file attachment can also include decompressing a file structure included in the compressed file attachment. The file structure can also be stored. The file structure can then be used to navigate to an individual decompressed file included in the compressed file attachment. Once navigated to, the individual decompressed file can be previewed and/or stored.

Decompressing the file attachment to generate previews of the individual files and the file structure included in the compressed file attachment can be accomplished automatically without receiving a user initiation of the decompression process. Thus, when the user selects a preview of individual files, the files are already available for preview.

Yet another embodiment provides a method of generating previews of a compressed file attachment to a received email. The method includes receiving an email with a compressed file attachment, identifying the compressed file attachment type, identifying a file decompression module corresponding to the type of compressed file attachment, activating the decompression module to decompress the compressed file attachment to produce a decompressed file and to output the decompressed file for preview and storage.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIG. 2 is a screen capture of a displayed email, in accordance with embodiments of the present disclosure.

FIGS. 3-5 are screen captures of the displayed email after having selected the individual file DSC1100.jpg, in accordance with embodiments of the present disclosure.

FIGS. 6 and 7 are screen captures of a displayed email after having selected the individual file feedbackform.pdf, in accordance with embodiments of the present disclosure.

FIG. 8A is a screen capture of a displayed email after having selected the selectedshot.jpg, in accordance with embodiments of the present disclosure.

DETAILED DESCRIPTION

Several exemplary embodiments for a system and method for automatically generating previews of compressed file attachments and uncompressed file attachments to that may be attached to an email will now be described. It will be apparent to those skilled in the art that the present invention may be practiced without some or all of the specific details set forth herein.

The compressed file attachment can include multiple individual files and a file structure that organizes the individual files. Having direct access to the individual files and to be able to see the file structure that organizes the individual files in the compressed file attachment improves the user experience of receiving the compressed file attachment in the email by reducing the steps required to access the individual files and making the compressed status of the compressed file attachment substantially invisible to the user viewing the received email.

The uncompressed file can be any one of several types of files that can be previewed. A nonexhaustive list of examples of types of files include document files, spreadsheet files, text files, presentation files, many types of image files, formatted files such as PDFs, slideshows and many other types of files.

Figure 1A:
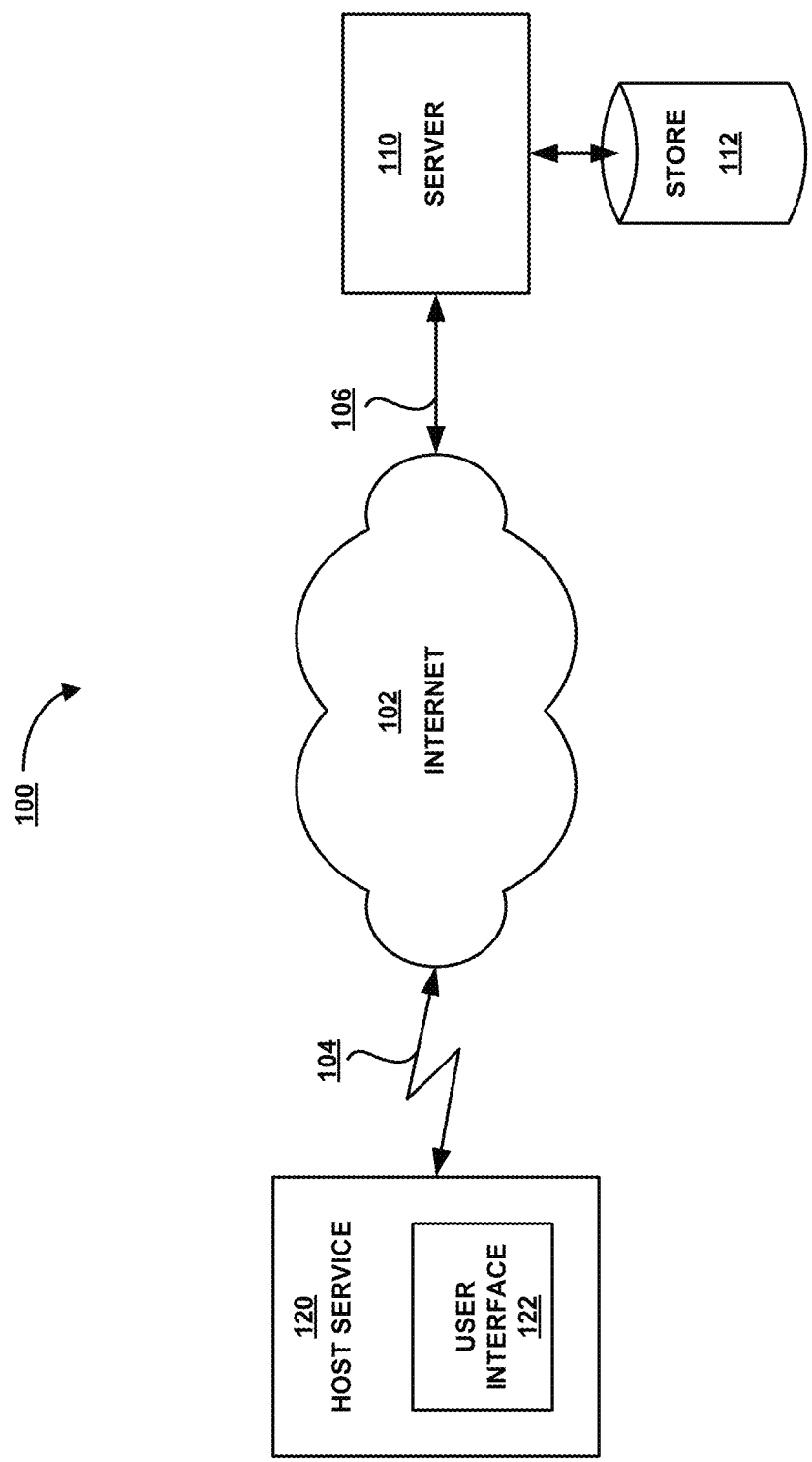
FIG. 1A is a network diagram of an online email service, in accordance with embodiments of the present disclosure.

FIG. 1A is a network diagram of an online email service 100, in accordance with embodiments of the present disclosure. The online email service 100 includes a host service 120. The host service 120 provides a user interface 122 for a user to interact with the email service. The user interface 122 displays emails to the user and provides an access for the user to read, write, save, edit, send, receive and otherwise interact with the emails.

The host service 120 can be a client device such as a personal computer or a handheld computing device such as a smart phone or a tablet. The host service 120 can also be a web hosted service provided on a server accessible via the Internet 102 or some other network using a browser application or a specific email application. The host service 120 is coupled to the Internet 102 with a network 104. The host service 120 is also coupled to an email server 110 by the network 104 and/or the Internet 102 and a network 106. The networks 104 and 106 can be local networks, wired or wireless networks and combinations thereof.

The email server 110 is also coupled to a store 112 for storing emails and other data related to emails such as compressed and uncompressed files that are attached to or can be attached to emails. The email server 110 includes application modules for receiving, storing, processing, displaying, writing and sending and any other functional processing of emails.

Figure 1B:
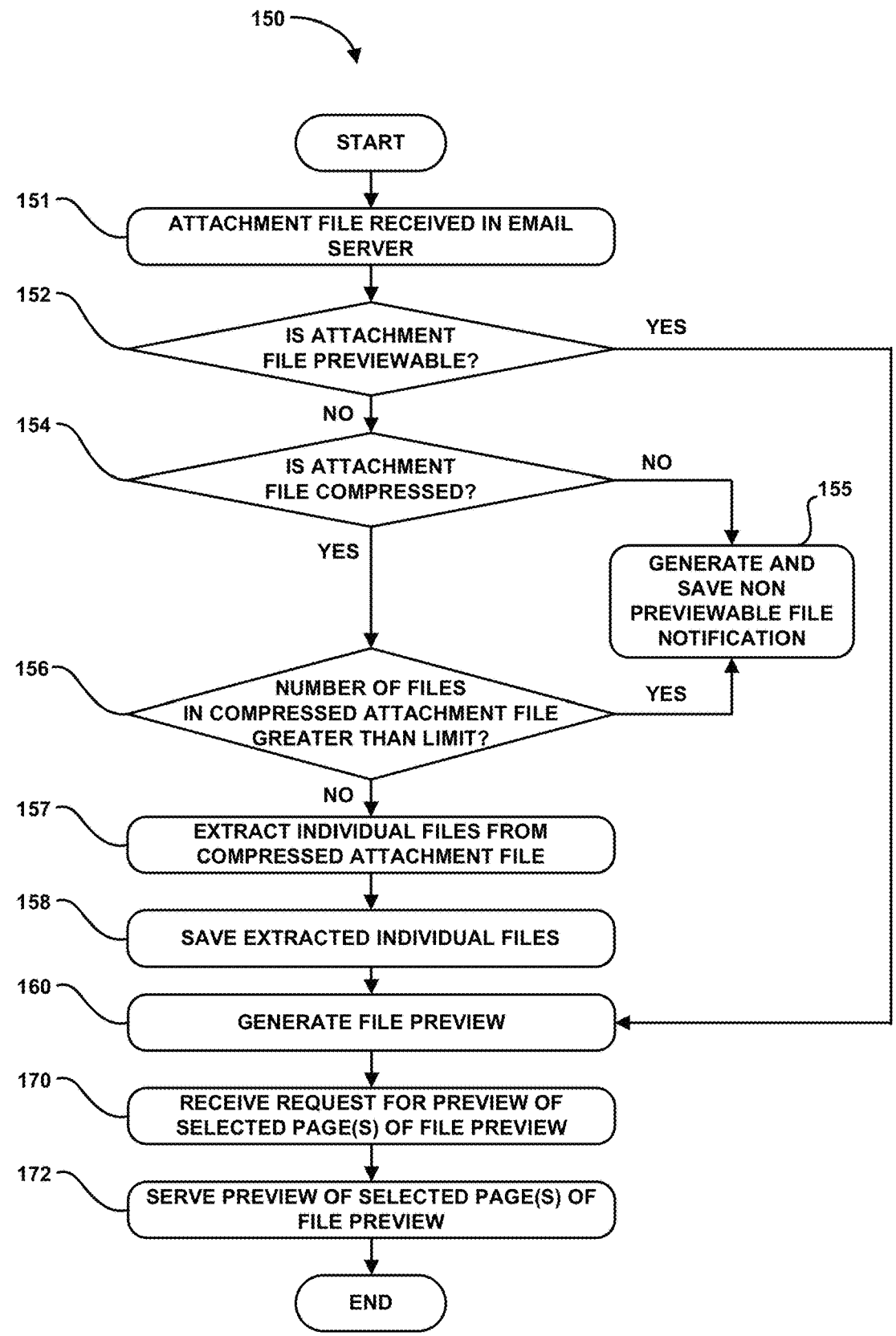
FIG. 1B is a flowchart diagram that illustrates the method operations performed in preparing a preview of a file that can be attached to an email, for implementing embodiments of the present disclosure.

FIG. 1B is a flowchart diagram that illustrates the method operations 150 performed in preparing a preview of a file that can be attached to an email, for implementing embodiments of the present disclosure. The operations illustrated herein are by way of example, as it should be understood that some operations may have sub-operations and in other instances, certain operations described herein may not be included in the illustrated operations. With this in mind, the method and operations 150 will now be described.

In an operation 151, a file attachment received in the email server. The file attachment may be received when an email with the file attachment is received an email server. The file attachment may also be received by the email server, as a user is composing an email and selects a file to attach to the email the user is composing.

In an operation 152, the email server reviews the file type of the file attachment to determine if the file type is one that the email server is configured for producing a preview able version of the file attachment. There many types of file attachments that could be received. Some examples might include an MS Word document file, and ASCII text file, a presentation files such as MS PowerPoint or similar presentations, a spreadsheet file, a formatted document file like an Adobe PDF formatted document, many types of image files such as a jpeg, gif, tif and any other standard image files, a slides show file, a video file in any of the various video formats, an audio file in any of the various audio formats, and many other well-known types of files that the email server may be configured for identifying. If the file attachment is pre-viewable then the method operations continue in an operation 158, as described below. If the file attachment is not pre-viewable in the method operations continue in operation 154 as follows.

In operation 154, the file attachment is examined to determine if it is a compressed file type. Compressed file attachment can include a zipped file or many other types of file compression formats. If the file attachment is not a compressed file and not a pre-viewable file as described in operation 152 above and the method operations continue in an operation 155.

In operation 155, a non-previewable file notification is generated and saved on the server. The non-previewable file notification can include a thumbnail that may be a representation of the type of file. As an example, if the file attachment is an executable file, then a small image of "EXE" or similar thumbnail may be generated. If the email server is unable to identify the file type of the file attachment, then a generic "non-previewable file" thumbnail may be associated with the file attachment on the email server.

Referring again to operation 154 above, if the file attachment is a compressed file type there may be multiple individual files within the compressed file attachment. Generally, a small number of individual files within the compressed file attachment would be easily dealt with as will be described below. However, often compressed file attachments can include many even hundreds or thousands of individual files. Thus, in an operation 156, the compressed file attachment is examined to determine if the compressed file attachment includes two numerous of the individual files to effectively generate a useful preview of all of the individual files. The limit for the number of individual files in the compressed file attachment can be set by the user or an email server setting or many other ways. In a typical example the number of individual files in the compressed file attachment would probably be limited to about ten as more than ten previews would tend to clutter the email when viewed by a user and thus make the previews less user-friendly and less useful by the user. Again is important understand that this limit is a selectable limit and the example limit of ten individual files in the compressed file attachment is merely an example and not a specific embodiment or limitation in any number of individual files could be selected as the limit.

If an operation 156, the number of individual files in the compressed file attachment is greater than the limit, then the method operations continue in operation 155 as described above and no preview of the individual files is generated and instead an appropriate non-previewable notification is generated and associated with the compressed file attachment.

If in operation 156, the number of individual files in the compressed file attachment is less than the limit, then the method operations continue in an operation 157. In operation 157, the email server activates a corresponding decompression application to perform a decompression operation of the compressed file attachment and extract each of the individual files from the compressed file attachment. The email server can activate the corresponding decompression application though calling the decompression application through a corresponding application program interface. The number of different types of decompression applications the email server may access is limited only by those decompression applications that are available to the email server.

In an operation 158, the individual extracted files from the compressed file attachment in operation 157 or the single, previewable, file attachment from operation 152, is stored in a file attachment store such as my be included in the store 112. And the method operations continue in operation 160 where the preview of each of the file attachments is generated. Operation 160 is described in more detail in FIG. 1C as described below.

In an operation 170, the email server receives a request for preview of a selected page of a file attachment. This request for preview the selected page of the file attachment would typically occur when the user opens an email including the file attachment. It should be noted that the preview of the file attachment is generated before the email is opened by a user and is generated automatically when the email server receives the file attachment and without requiring receiving a request to generate the preview.

In an operation 172, the email server responds to the request for preview of the selected page of a file attachment by sending a preview of the selected pages to the user's user interface to the email server. One approach to sending a preview of the selected pages includes fetching a parent frame from the file attachment store coupled to the email server. The parent frame pulls the page data that was extracted from the selected page, or pages, of the file attachment. The parent frame and a properly formatted cascading style sheets provide formatting for the page data that was extracted from the selected page of the file attachment. The parent frame provides for a simple and efficient assembly of an HTML representation of the selected page within the email user interface as will be described in more detail below. Another approach to sending a preview of the selected pages could include opening a browser tab for presenting the preview instead of presenting the preview within the email user interface. Another approach can include using an image overlay such as scalable vector graphics with a text overlay as a preview of the selected page of the file attachment.

The parent frame can be stored with the page data that was extracted from the selected page. HTML frames, such as the parent frame, allow a page author to present the information in the HTML page in multiple views. Views may be independent windows or subwindows. Multiple views offer the page author different ways to present selected information, while other information in views can be viewed or presented by scrolling. In one example, using three frames: a first frame for a static banner, a second frame for a navigation menu, and third frame for a main view that can be scrolled though or replaced by clicking on an item in the third frame. Multiple different parent frames can be defined and saved by the server at some time before the file attachment is received by the server. By way of example, certain parent frames may be optimized and associated for use with text or document file attachments while a different parent frame may be optimized and associated for use with a file attachment including one or more images and yet a third parent frame that may be optimized and associated for use with file attachment that includes one or more images and text. When the server identifies the file type and or content of the file attachment, a corresponding parent frame can be selected that is optimized for that type of file attachment or the content included in the file attachment.

Figure 1C:
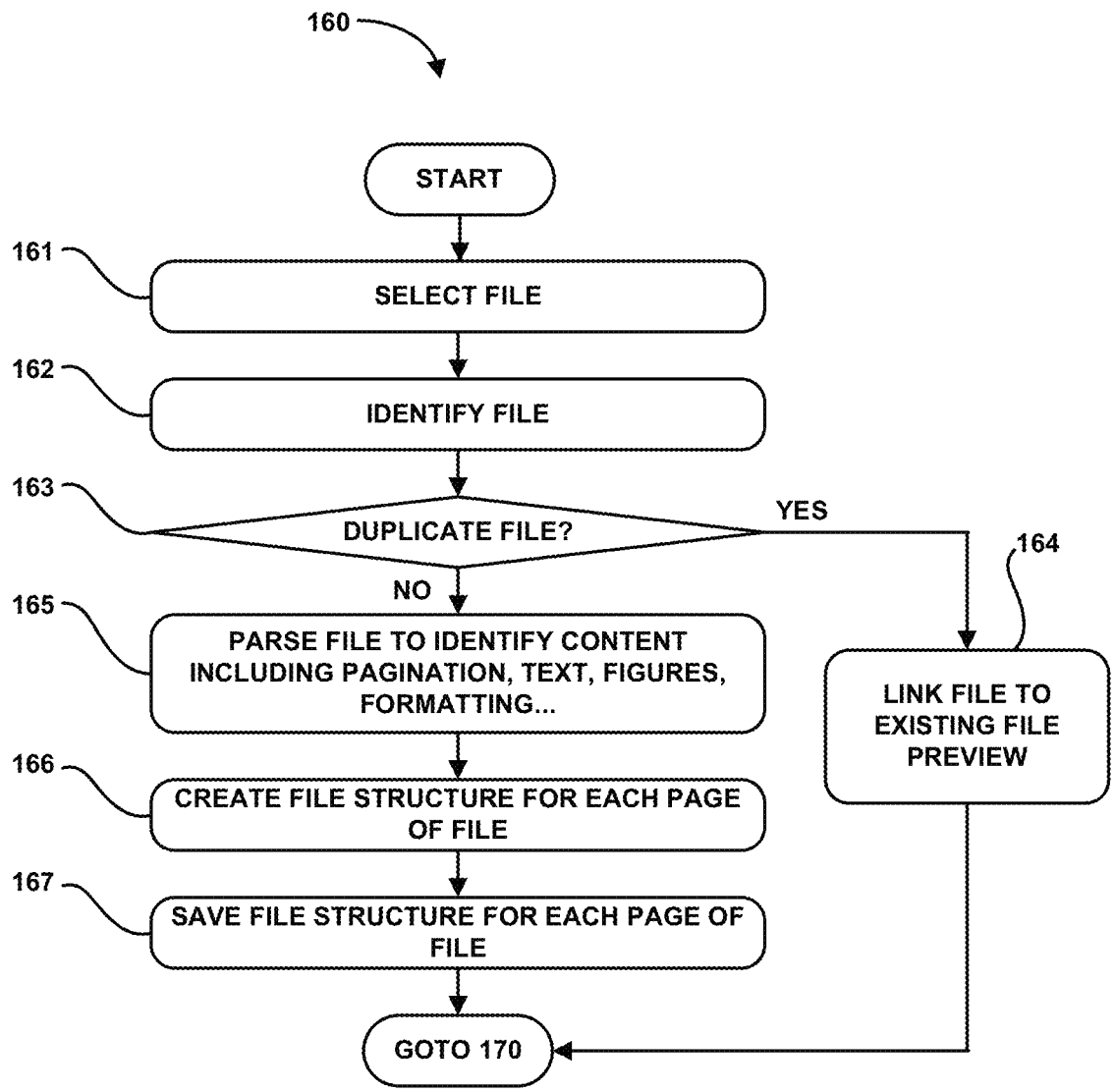
FIG. 1C is a flowchart diagram that illustrates the method operations performed in preparing a preview of a file attachment to an email, for implementing embodiments of the present disclosure.

FIG. 1C is a flowchart diagram that illustrates the method operations 160 performed in preparing a preview of a file attachment to an email, for implementing embodiments of the present disclosure. The operations illustrated herein are by way of example, as it should be understood that some operations may have sub-operations and in other instances, certain operations described herein may not be included in the illustrated operations. With this in mind, the method and operations 160 will now be described.

In an operation 161, one of the file attachments saved in the file attachment store is selected for generating a preview of the file attachment. The order of selecting the files from the file attachment store can be defined any suitable manner. By way of example, a user preference could be selected or captured so that file types that are most likely to be desired for preview may be selected before file types that are less likely to be desired for preview. Which file types are most likely to be desired or less likely to be desired for preview can be captured according to prior user use patterns. For example if the user prefers seeing documents as previews than a document file would have a preview generated before other types of documents. For another user that prefers previews of image files, then file attachments of images could be used to generate previews first.

In an operation 162, the selected file is identified. One approach to identifying the file is to perform a hash operation on the selected file to generate a unique file identifier. The file identifier can then be used to uniquely identify the file.

In an optional operation 163, file identifier is used to determine if the selected file is a duplicate file. This optional operation 163 streamlines the email servers processes by preventing unnecessary duplication if a preview of the file attachment has been previously generated. If the selected file is a duplicate file, then the method operations continue in an operation 164 and the selected file is linked to an existing file preview in the file attachment store.

If the selected file is not a duplicate file in the method operations continue in an operation 165. In operation 165, the selected file is parsed to identify the content of the selected file. For example, if the selected file included multiple pages, formatted text and multiple images, then the file would be examined to first identify each and every page of the selected file. Next each page would be parsed to identify the contents of each page.

In an operation 166, a file structure is created for each page of the selected file and the corresponding data is saved in each of the file structures for each page in an operation 167. The file structure for each page includes the unique document identifier, the page identifier and HTML contents folder including all of the data required to create an HTML representation of that page of the selected file. In one implementation, the HTML contents folder would include the cascading style sheets and the various HTML files. Dividing the selected file into multiple individual pages allows previews of selected pages to be served to the user more efficiently and simply than requiring serving a preview of all of the pages of the selected file. Dividing the selected file in the multiple individual pages may also require accessing a corresponding application to open the selected file by a corresponding application program interface. It should be understood that, the different types of files that can be previewed is limited only by the email server having access to the corresponding applications needed to access the selected file.

The file structure for each page can also include a thumbnail such as a small graphical representation of the page. In one example the thumbnail is limited to a very finite size such as 36×36 pixels. This is merely an example as a thumbnail could be any suitable size that might be chosen.

After the file structure for each page is saved the method operations of 160 are repeated for each additional document and then the method operations can continue in operation 170 as discussed above in FIG. 1B.

As the preview of each of the file attachments includes individual previews of each page of the file attachment, then the pages of the file attachment can be previewed sequentially if the user desires, but can also be previewed randomly. For example if a document file attachment includes 15 pages, and the user is interested in the content of page 12, the user can directly select a preview of page 12, rather than selecting the entire 15 page document and scanning or paging through to access page 12.

FIG. 2 is a screen capture of a displayed email 200, in accordance with embodiments of the present disclosure. The displayed email 200 includes a header portion 201 that includes functionality for the user to access their emails. The header portion 201 can include an identifier for the owner of the email inbox "Jennifer" in the upper right corner. The header portion 201 can also include other functionality such as accessing other services such as News, Sports, Weather, etc. provided by the email service provider.

The various buttons and identifiers can also include optional icon representations such as the icon adjacent to the "Jennifer" identifier on the email inbox. The icons can include functionality such as accessing additional information about that button (e.g., can provide access to Jennifer's profile page) or can merely be an additional graphic to add to the page such as a thumbnail of Jennifer's face. Similar icons and thumbnails are provided throughout the displayed email 200.

One portion of the header 210 includes functional buttons such as the icons to the left portion and DELETE, MOVE, SPAM and MORE buttons to choose functions the user is wishes to apply to a selected email. The MORE button provides a menu of less commonly used email processing functions that a user might apply to a selected email.

A list of folders 203 is displayed along the left column of the displayed email 200. The list of folders 203 includes folders that the user may have created to organize previously sent and received emails. The list of folders 203 allows the user to navigate to the folders and access emails stored therein. Also shown in the left column is an optional space 205 for providing ads.

Toward the center of the displayed email 200, is a subject line 208. In this instance the subject line 208 reads "Last night meetup." Also included in the subject line 208 is a paperclip or similar icon 208A indicating there is one or more files attached to the displayed email 200.

Immediately below the subject line is the email body 202 of the displayed email 200. The email body 202 includes the text of the actual email message sent by a sender of the email. The email body 202 can also identify the sender and the receiver and a time and a date the email was sent. As shown the email body 202 also includes a paperclip or similar icon 208B indicating there is at least one file attached the displayed email 200. As shown, multiple files are actually attached to the displayed email 200.

Below the email body 202 displayed email 200 is a thumbnail area 206 showing small iconic representations, often referred to as thumbnails, of the files attached to the displayed email 200. Between the thumbnail area 206 and the email body 202 is an area 212 including multiple functional buttons relating to the attached files. In this instance there are buttons for "View All" to view all of the attached files, and "Download All" to download all of the attached files. Also provided is a list that specifies there are 8 different attached files.

One of the attached files is "Environment.zip" 228 having a thumbnail that resembles a clamp compressing multiple sheets of paper to indicate Environment.zip is a compressed file including multiple individual files. It should be understood that there are many different iconic representations of a compressed file and this is merely one example of a compressed file attachment.

The compressed file attachment Environment.zip is selected and a file structure 204 of Environment.zip is shown to the right of the email body 202. The .zip suffix indicates the Environment.zip file is a compressed file including one or more individual files and can also include a file structure organizing the individual files. It should be understood that ".zip" type files are one example of a compressed file but there are many different types of compressed files and the processes described herein are applicable to each different types of compressed files. As displayed the Environment.zip file includes a file structure 204 of three individual files 230, 232 and 234 in a top-level folder and two subfolders: Insurance 236 and Last weekend 238. Each of the two subfolders Insurance 236 and Last weekend 238 can include multiple individual files that are not shown in this preview of the file structure 204.

Figure 3:
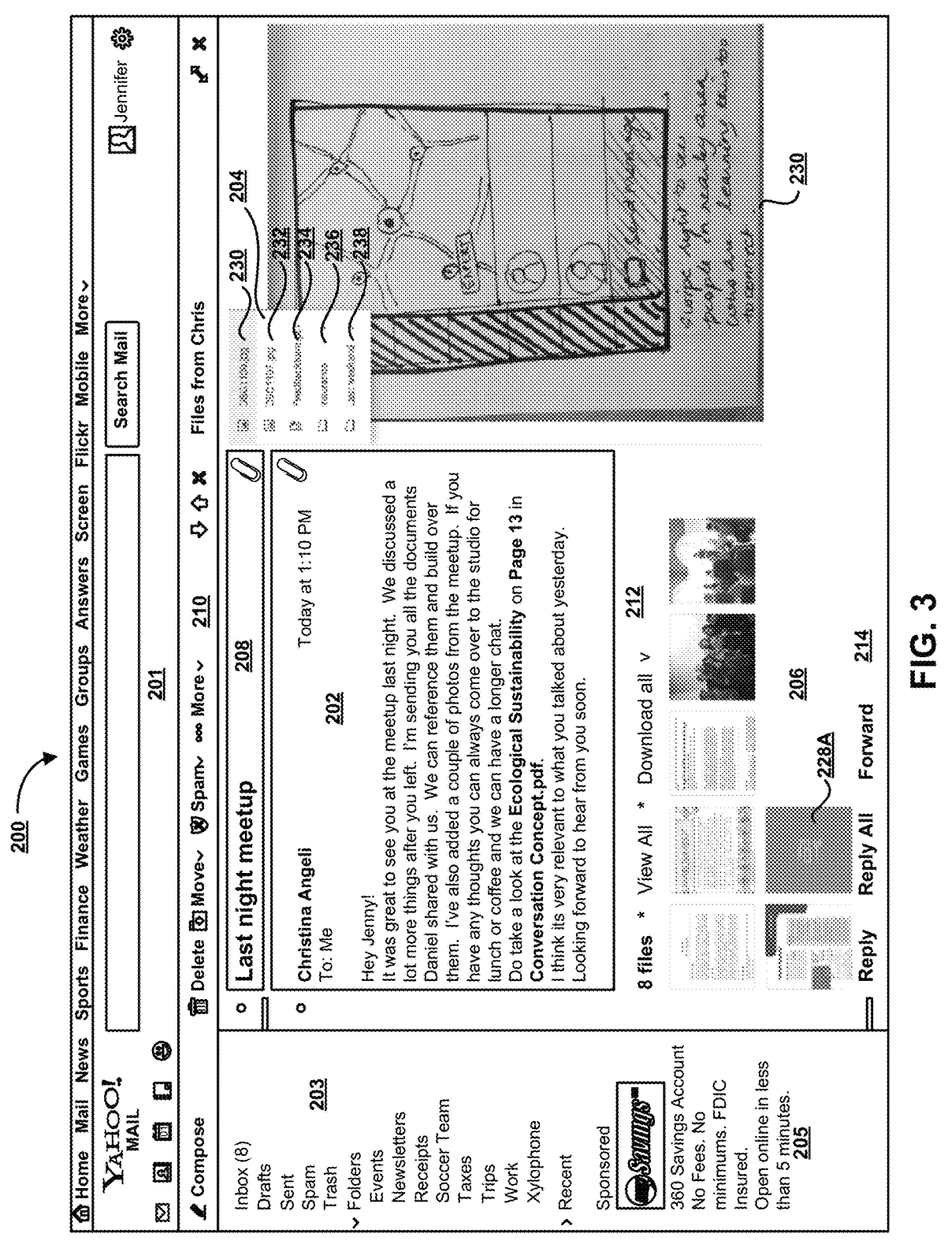
Figure 4:
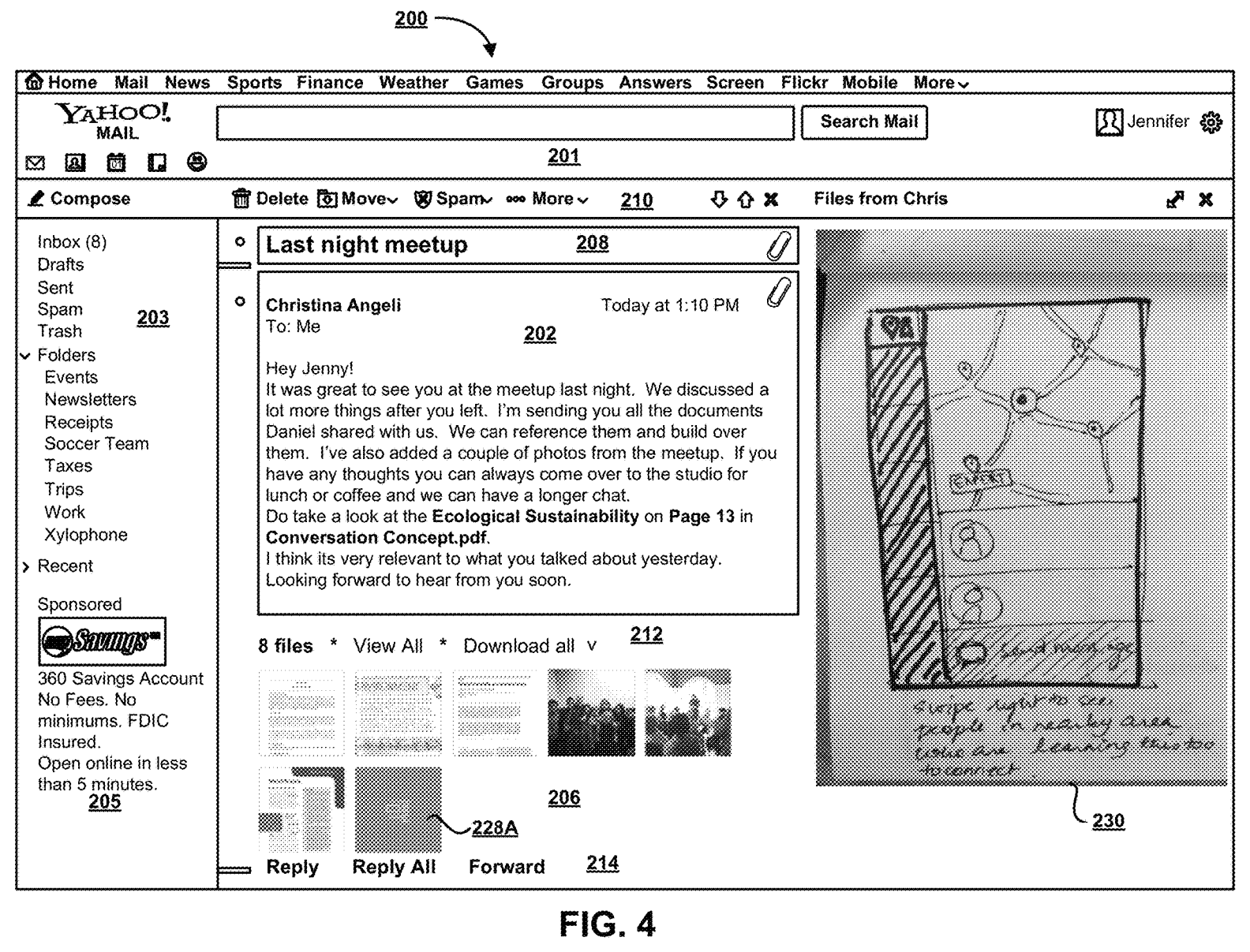
Figure 5:
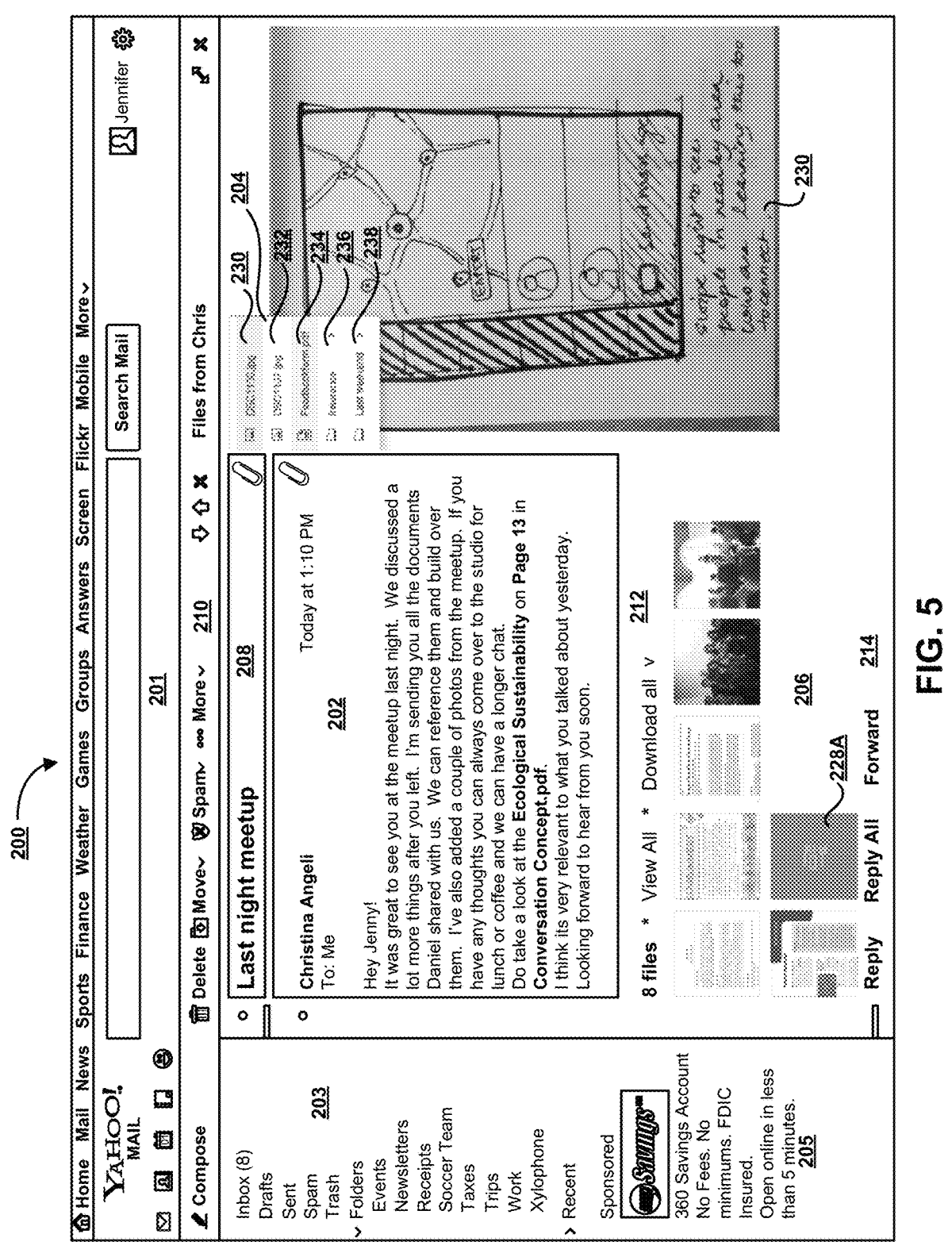

The user can utilize the user interface 122 to navigate to and select one of the individual files such as DSC1100.jpg 230. FIGS. 3-5 are screen captures of the displayed email 200 after having selected the individual file DSC1100.jpg 230, in accordance with embodiments of the present disclosure. Selecting DSC1100.jpg 230 causes the selected file to be displayed to the right of the email body 202 as shown in FIG. 3. The file structure 204 can also be seen. In this instance DSC1100.jpg is a drawing that was presented during the meetup that is the subject of the displayed email 200.

In FIG. 4, the file structure 204 is hidden and the individual file DSC1100.jpg 230 is shown more clearly. In FIG. 5, the file structure 204 is again shown and the user is shown navigating the file structure to select the feedbackform.pdf 234. The file structure can be selected by selecting a corner of the DSC1100.jpg or by selecting another icon for displaying the file structure or by selecting the "Environment.zip" above the displayed DSC1100.jpg 230.

Figure 6:
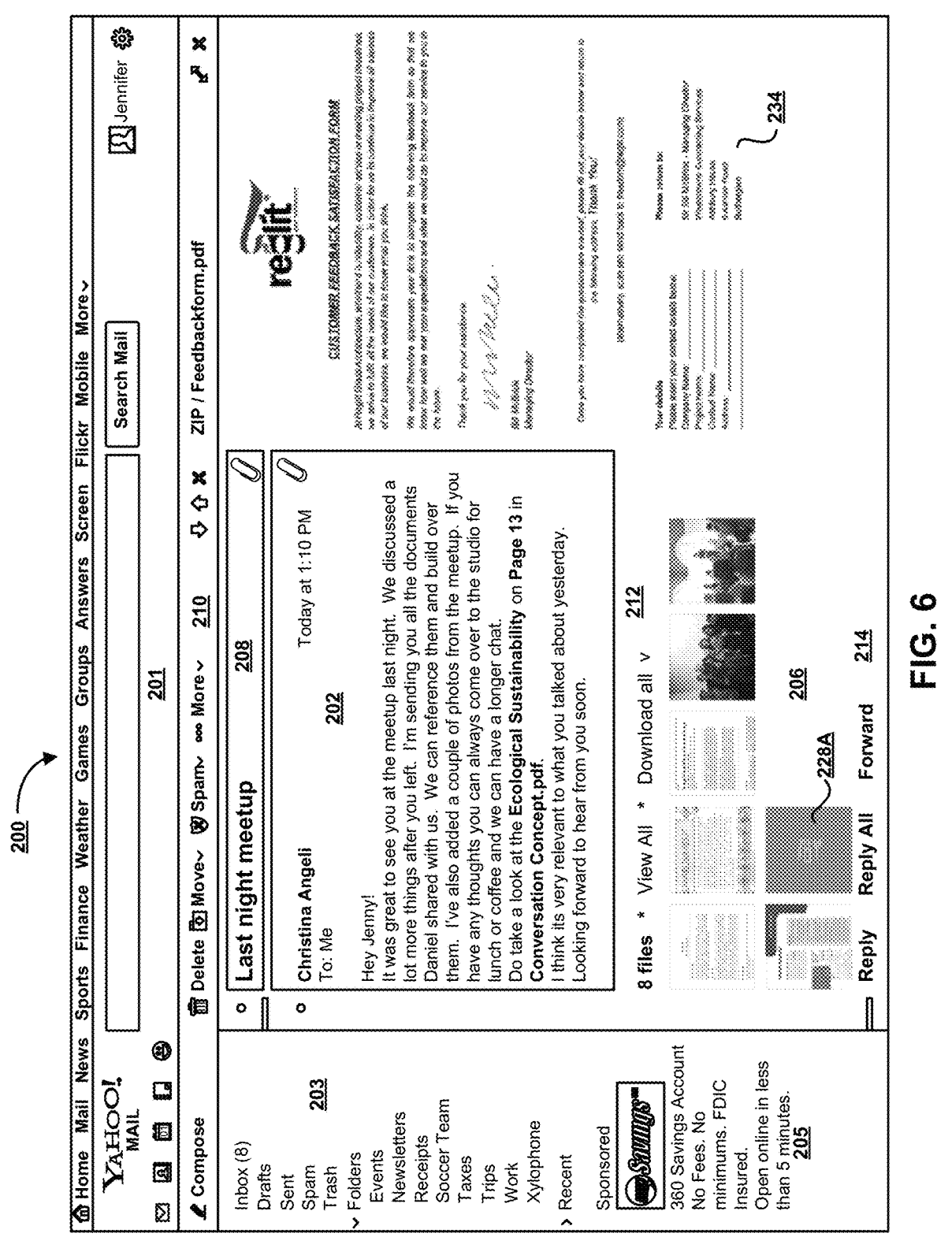
Figure 7:
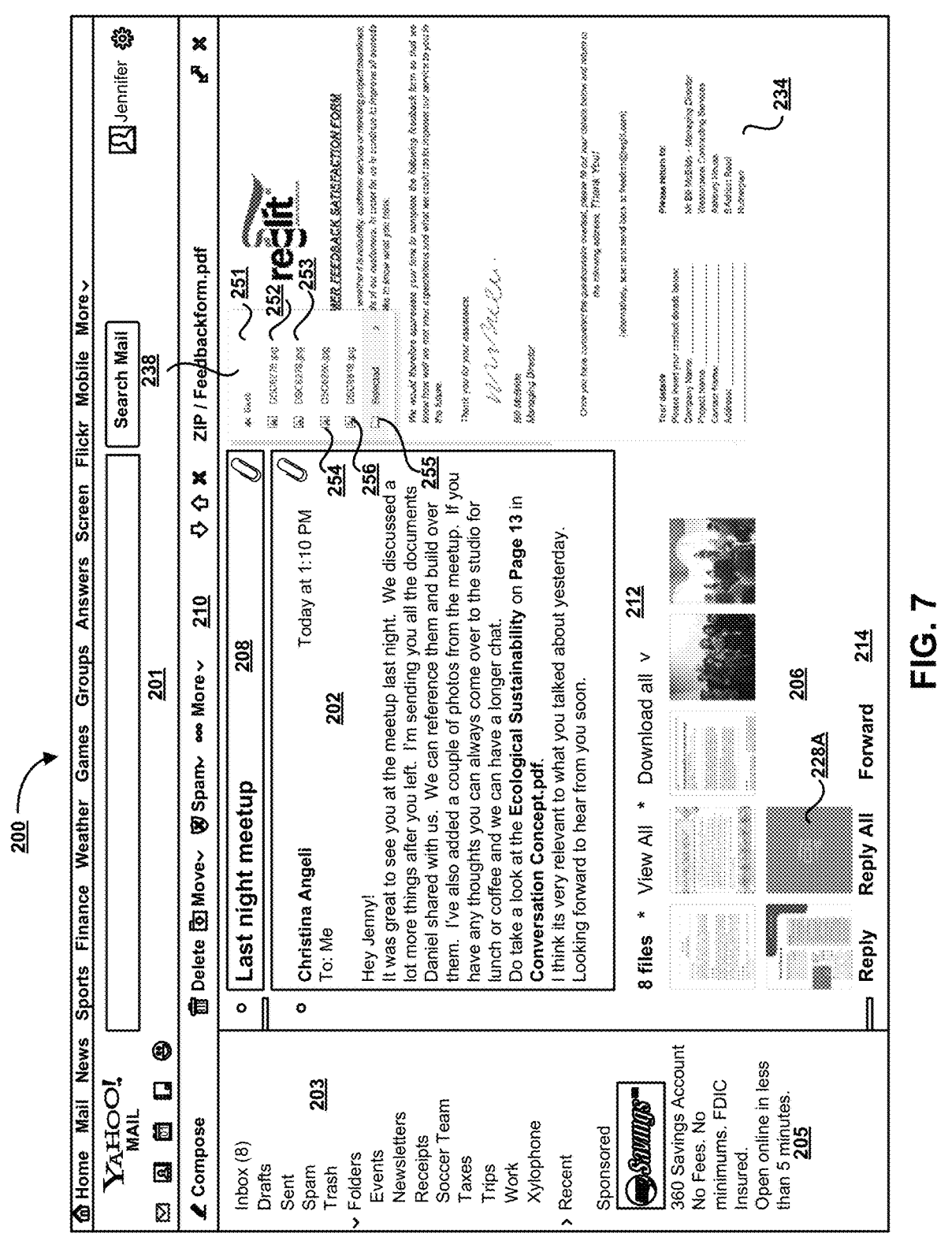

FIGS. 6 and 7 are screen captures of a displayed email 200 after having selected the individual file feedbackform.pdf 234, in accordance with embodiments of the present disclosure. Selecting feedbackform.pdf 234 causes a preview of the selected file to be displayed to the right of the email body 202. In FIG. 7, a subfolder file structure 238 is shown and the user has navigated the file structure to select another subfolder file structure entitled "Selected" 255. Selecting Selected 255 opens the subfolder entitled "Selected." Within the Selected subfolder is a file entitled "selectedshot.jpg" 260.

Figure 8A:
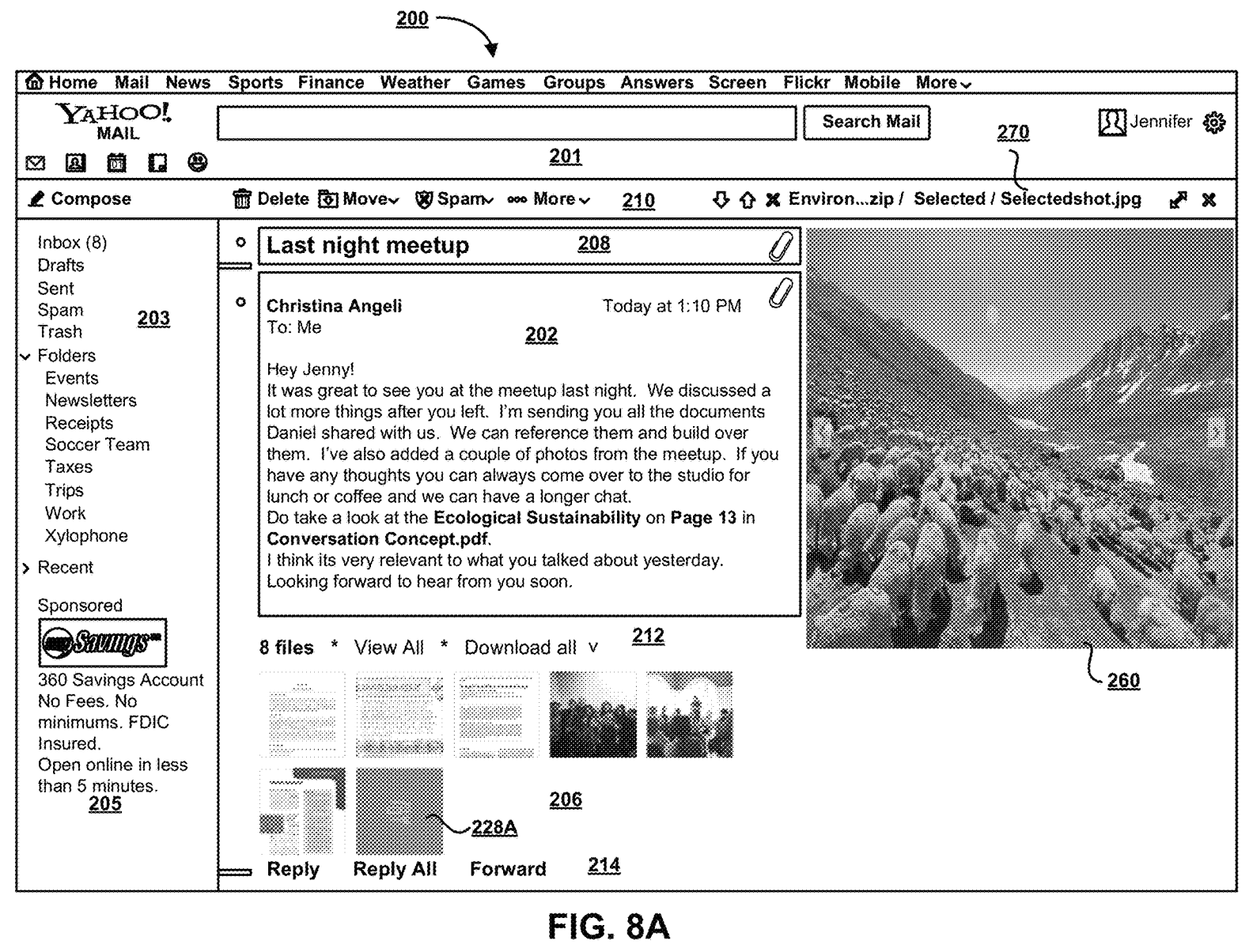

FIG. 8A is a screen capture of a displayed email 200 after having selected the selectedshot.jpg 260, in accordance with embodiments of the present disclosure. Selecting selectedshot.jpg 260 causes the selectedshot.jpg to be displayed to the right of the email body 202. The directory structure 270 and access the selectedshot.jpg 260 is optionally shown directly above the selectedshot.jpg.

Figure 8B:
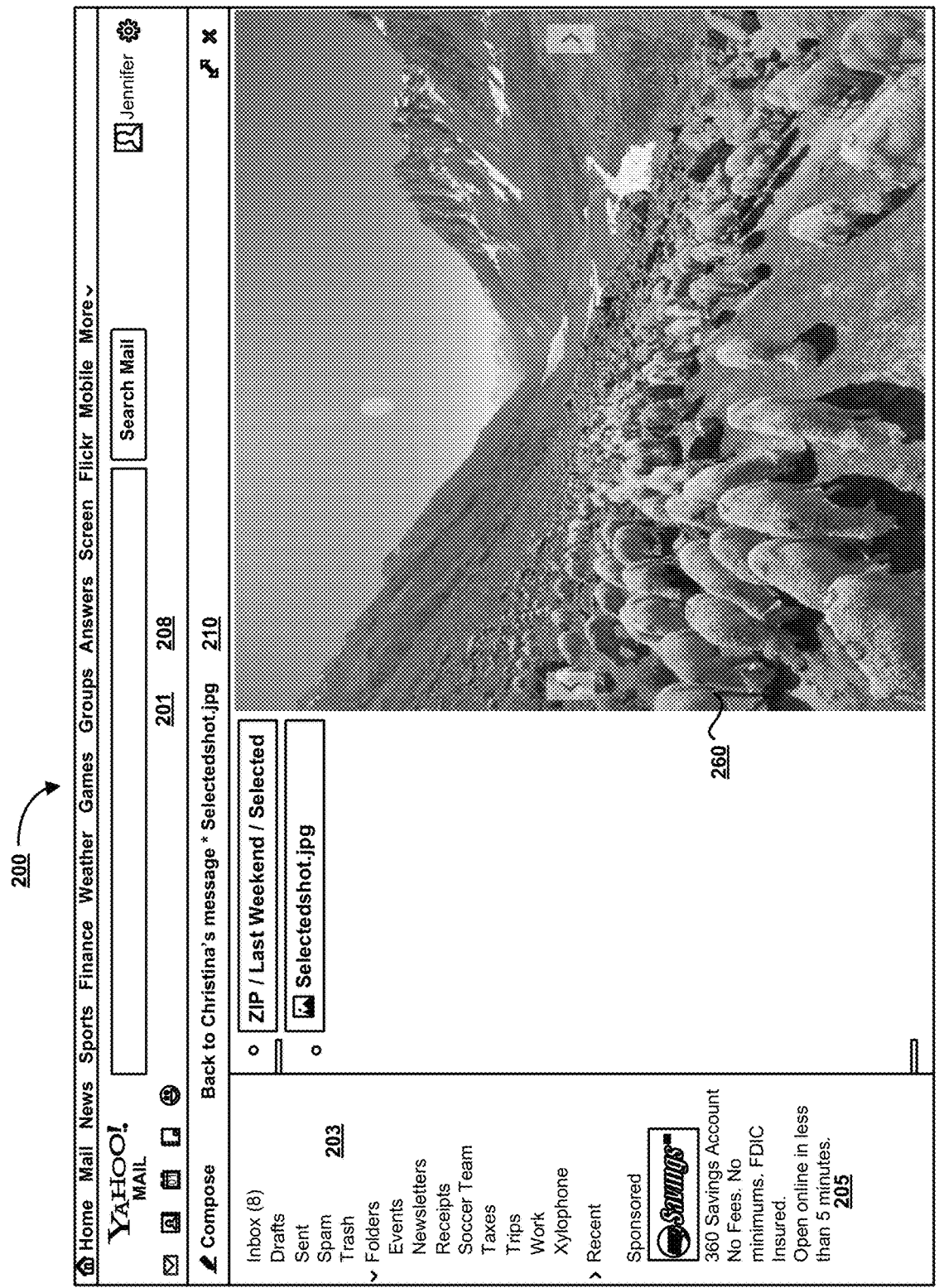
FIG. 8B is a screen capture of a displayed email with a full screen view of the selectedshot.jpg, in accordance with embodiments of the present disclosure.

The selectedshot.jpg 260 can also be shown in full screen view. The selectedshot.jpg 260 can also be shown in full screen view. FIG. 8B is a screen capture of a displayed email 200 with a full screen view of the selectedshot.jpg 260, in accordance with embodiments of the present disclosure.

Figure 9:
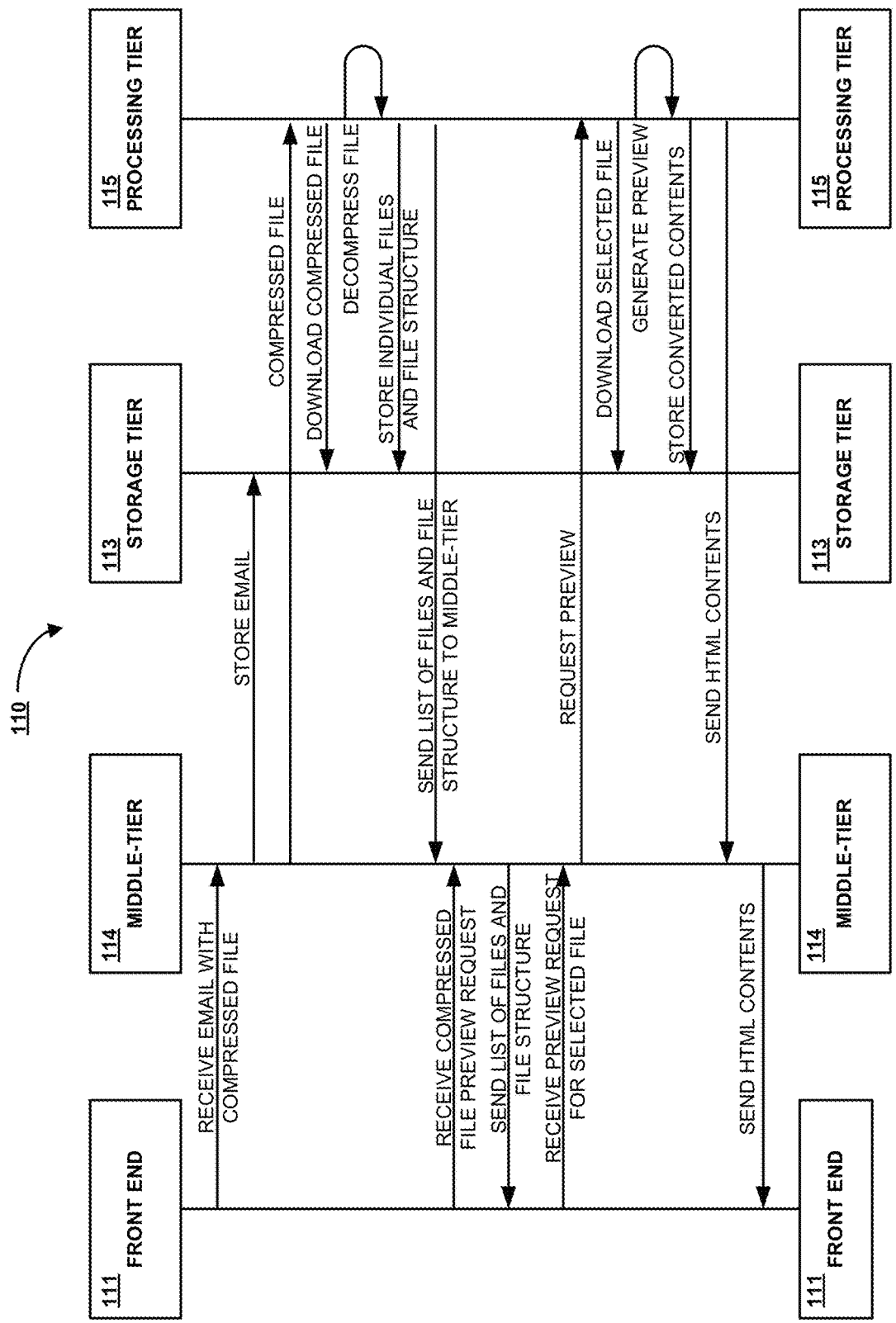
FIG. 9 is a logic processing flow diagram of the email server, in accordance with embodiments of the present disclosure.

FIG. 9 is a processing flow diagram of the email server 110, in accordance with embodiments of the present disclosure. The email server 110 includes a front end 111, a middle tier 114, a storage tier 113, and a processing tier 115. The front end 111 receives the email and includes a user interface module for communicating with a user interface 122 on a client device. The middle tier 114 directs the email to the appropriate portion of the email server 110. The storage tier 113 provides the data storage for the email server 110. The storage tier 113 can also include or be coupled to the store facility 112 described above FIG. 1. The processing tier 115 provides the needed processing functionality of the email that is received or decompressed or sent or stored.

Returning to our example above with a compressed file attached to an email, an email is received by the front end 111, with a compressed file attached. The front-end directs the received email to the middle tier 114. The middle tier 114 stores the email by directing the email to the storage tier 113. The middle tier 114 can also detect the presence of the compressed file attachment in the email and forward the email to the processing tier 115 for further processing.

The processing tier 115 receives the email with the compressed file attachment and extracts the compressed file attachment from the email and directs the compressed file attachment to the storage tier 113 for storage. The processing tier 115 also analyzes the compressed file attachment to determine the type of compressed file and what is necessary to decompress the compressed file attachment. By way of example, there are multiple types of file compression formats that may be included in the compressed file attachment. Returning to our previous example of Environment.zip in which the ".zip" defines the type of compression format of the Environment.zip file.

Once the processing tier 115 determines what functionality is necessary to decompress the compressed file attachment, the processing tier can perform a decompression of the compressed file attachment.

The processing tier 115 directs the resulting decompressed file attachment including the multiple individual files and any file structure to the storage tier 113 for storage. The processing tier 115 also forwards a list of the individual files in the file structure to the middle tier 114.

When a user selects to preview the compressed file attachment a request for the preview of the compressed file attachment is received by the front end 111. The front end 111 forwards the preview request of the compressed file attachment to the middle tier 114.

The middle tier responds to the preview request of the compressed file attachment by forwarding the list of individual files and the file structure included in the compressed file attachment to the front end 111. The front end 111 forwards the list of individual files and the file structure included in the compressed file attachment to the user interface 122. The user interface 122 presents the list of individual files and the file structure 204 as shown in FIG. 2 above. It should be understood that in some instances a preview of the compressed file attachment can be generated and displayed automatically similar to the presentation of previews of any non-compressed file attachments, as shown in the preview area 206 in FIG. 2 above.

When the user selects a preview of one of the individual files and/or the file structure included in the compressed file attachment, a request for the preview of the individual files and/or the file structure is received by the front end 111. The front end 111 forwards the preview request of the individual files and/or the file structure to the middle tier 114.

The middle tier 114 forwards the preview request of the individual files and/or the file structure to the processing tier 115. The processing tier 115 downloads the selected file and generates a preview of the selected file. As noted above, one type of preview is a thumbnail or similar visually small and/or simplified version of the selected file to represent the selected file that is suitable for presentation in the user interface 122. In one example, the preview can be an HTML type document or similar suitable document.

The processing tier 115 directs the generated preview and/or the file structure to the storage tier 113 for storage. The processing tier 115 also directs the generated preview and/or file structure to the middle tier 114. The middle tier 114 forwards the generated preview and/or file structure to the front end 111. The front end 111 forwards the generated preview and/or file structure to the user interface 122. The file preview can be displayed in the file preview portion to the right of the email body 202 as shown in FIGS. 3-8B above.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An email system comprising:
an email server comprising:
one or more processors;
a front end configured for receiving an email from an email service coupled to the email server by a network;
a middle tier configured for detecting a compressed file attachment attached to the email, the compressed file attachment comprising a plurality of individual files;
a storage tier associated with a storage configured for storing the email and the compressed file attachment;
a processing tier comprising a decompressing process module configured for receiving the compressed file attachment, determining a type of compressed file attachment, determining a corresponding file decompression module from a plurality of file decompression modules, activating the corresponding file decompression module for decompressing the compressed file attachment to produce a decompressed file, the decompressed file having the plurality of individual files as decompressed, generating thumbnail content views for each of the plurality of individual files, storing the decompressed file in the storage tier and outputting the decompressed file to the middle tier; and
a user interface module configured for communicating with a user client device to provide a user interface, the user interface configured for displaying the thumbnail content views of the plurality of individual files, wherein a selection of one of the thumbnail content views is configured to cause an individual file view of a respective one of the plurality of individual files to be displayed within the user interface, wherein the individual file view of the respective one of the plurality of individual files is greater in size than the one of the thumbnail content views that is selected;
wherein at least one of the front end, the middle tier, the storage tier, the processing tier, or the user interface module is implemented using the one or more processors.

2. The email system of claim 1, wherein the thumbnail content views of the plurality of individual files comprise scaled down images of the plurality of individual files included within the compressed file attachment, wherein the scaled down images of the plurality of individual files are configured to be displayed concurrently with a body of text of the email within the user interface.

3. The email system of claim 2, wherein an additional selection of an additional thumbnail content view is configured to cause an additional individual file view of an additional respective one of the plurality of individual files to be displayed within the user interface with the thumbnail content views.

4. The email system of claim 1, wherein the user interface module is configured for communicating with the user client device to provide a file structure preview of contents of the compressed file attachment, wherein the file structure preview comprises file name and file type information of the plurality of individual files of the compressed file attachment.

5. The email system of claim 1, wherein the compressed file attachment comprises a file structure for organizing at least one file included in the compressed file attachment.

6. The email system of claim 5, wherein the processing tier is configured for detecting the file structure in the compressed file attachment and storing the file structure and outputting a preview of the file structure.

7. The email system of claim 6, wherein the front end is configured for outputting the preview of the file structure to the user interface for display by the user interface.

8. The email system of claim 5, wherein the processing tier is configured for outputting the file structure and the front end is configured for outputting the file structure to the user interface for the user interface to display and provide a navigation of the file structure.

9. The email system of claim 1, wherein the processing tier produces a preview of the compressed file attachment when a compressed file preview request is received in the front end.

10. The email system of claim 1, wherein the processing tier produces a preview of the decompressed file when a file preview request is received in the front end.

11. A method, implemented by an email server, comprising:
receiving, via a front end, an email from an email service coupled to the email server by a network;
detecting, via a middle tier, a compressed file attachment attached to the email, the compressed file attachment comprising a plurality of individual files;
storing, via a storage tier associated with a storage, the email and the compressed file attachment;
receiving, via a processing tier, the compressed file attachment;
determining, via the processing tier, a type of compressed file attachment;
determining, via the processing tier, a corresponding file decompression module from a plurality of file decompression modules;
activating, via the processing tier, the corresponding file decompression module for decompressing the compressed file attachment to produce a decompressed file, the decompressed file having the plurality of individual files as decompressed;
generating, via the processing tier, thumbnail content views for each of the plurality of individual files;
storing, via the processing tier, the decompressed file in the storage tier;

outputting, via the processing tier, the decompressed file to the middle tier;

communicating, via a user interface module, with a user client device to provide a user interface; and displaying, via the user interface module, the thumbnail content views of the plurality of individual files, wherein a selection of one of the thumbnail content views is configured to cause an individual file view of a respective one of the plurality of individual files to be displayed within the user interface, wherein the individual file view of the respective one of the plurality of individual files is greater in size than the one of the thumbnail content views that is selected.

12. The method of claim 11, wherein the thumbnail content views of the plurality of individual files comprise scaled down images of the plurality of individual files included within the compressed file attachment, wherein the scaled down images of the plurality of individual files are configured to be displayed concurrently with a body of text of the email within the user interface.

13. The method of claim 12, wherein an additional selection of an additional thumbnail content view is configured to cause an additional individual file view of an additional respective one of the plurality of individual files to be displayed within the user interface with the thumbnail content views.

14. The method of claim 11, comprising:
communicating with the user client device to provide a file structure preview of contents of the compressed file attachment, wherein the file structure preview comprises file name and file type information of the plurality of individual files of the compressed file attachment.

15. The method of claim 11, wherein the compressed file attachment comprises a file structure for organizing at least one file included in the compressed file attachment.

16. A non-transitory computer readable medium comprising computer readable code that when executed by one or more processors causes performance of operations, the operations comprising:

receiving, via a front end, an email from an email service coupled to an email server by a network;

detecting, via a middle tier, a compressed file attachment attached to the email, the compressed file attachment comprising a plurality of individual files;

storing, via a storage tier associated with a storage, the email and the compressed file attachment;

receiving, via a processing tier, the compressed file attachment;

determining, via the processing tier, a type of compressed file attachment;

determining, via the processing tier, a corresponding file decompression module from a plurality of file decompression modules;

activating, via the processing tier, the corresponding file decompression module for decompressing the compressed file attachment to produce a decompressed file, the decompressed file having the plurality of individual files as decompressed;

generating, via the processing tier, thumbnail content views for each of the plurality of individual files;

storing, via the processing tier, the decompressed file in the storage tier;

outputting, via the processing tier, the decompressed file to the middle tier;

communicating, via a user interface module, with a user client device to provide a user interface; and displaying, via the user interface module, the thumbnail content views of the plurality of individual files, wherein a selection of one of the thumbnail content views is configured to cause an individual file view of a respective one of the plurality of individual files to be displayed within the user interface, wherein the individual file view of the respective one of the plurality of individual files is greater in size than the one of the thumbnail content views that is selected.

17. The non-transitory computer readable medium of claim 16, wherein the thumbnail content views of the plurality of individual files comprise scaled down images of the plurality of individual files included within the compressed file attachment, wherein the scaled down images of the plurality of individual files are configured to be displayed concurrently with a body of text of the email within the user interface.

18. The non-transitory computer readable medium of claim 17, wherein an additional selection of an additional thumbnail content view is configured to cause an additional individual file view of an additional respective one of the plurality of individual files to be displayed within the user interface with the thumbnail content views.

19. The non-transitory computer readable medium of claim 16, the operations comprising:
communicating with the user client device to provide a file structure preview of contents of the compressed file attachment, wherein the file structure preview comprises file name and file type information of the plurality of individual files of the compressed file attachment.

20. The non-transitory computer readable medium of claim 16, wherein the compressed file attachment comprises a file structure for organizing at least one file included in the compressed file attachment.

* * * * *